July 31, 1945.  W. H. OPITZ  2,380,672

FLEXIBLE COUPLING

Filed March 8, 1944

Inventor
William H. Opitz
By Blackmar, Spencer & Flint
Attorneys

Patented July 31, 1945

2,380,672

UNITED STATES PATENT OFFICE 2,380,672

FLEXIBLE COUPLING

William H. Opitz, Palos Heights, Ill., assignor to General Motors Corporation, Detroit, Mich., a corporation of Delaware Application March 8, 1944, Serial No. 525,499

2 Claims. (Cl. 64—12)

This invention relates to flexible couplings and more particularly to an improved low cost joint structure adapted for the transmission of torque between driving and driven shafts and constructed easily from a few readily available parts, consisting essentially of one or more conventional rubber bushing units connected at opposite ends to the shafts to be coupled and arranged on an axis substantially tangent to the axis of drive rotation for the transmission of torque in either direction through the rubber bushing acting in shear.

In the preferred embodiment of the invention a series of coupling units are disposed in circumferentially spaced relation and each has a cylindrical bushing of rubber or other similar elastic deformable material secured between an outer sleeve and an inner core constituting a rubber packed cylinder and plunger assembly with oppositely extending cylinder and plunger terminals projecting from opposite ends for hinged attachment with the driving and driven members. There are thus provided articulated struts through which the driving force is transmitted axially of the struts with the rubber stressed in shear and the whole serving to cushion impulses and being flexible to eliminate the need for extreme manufacturing accuracy and to accommodate angularity and misalignment of the parts to be coupled. To assist in dampening torque impulses the terminal extension of the cylinder is formed as a closure cap to afford a hollow chamber which cooperates with the plunger in providing a dashpot or air cushion pocket.

Figure 1:
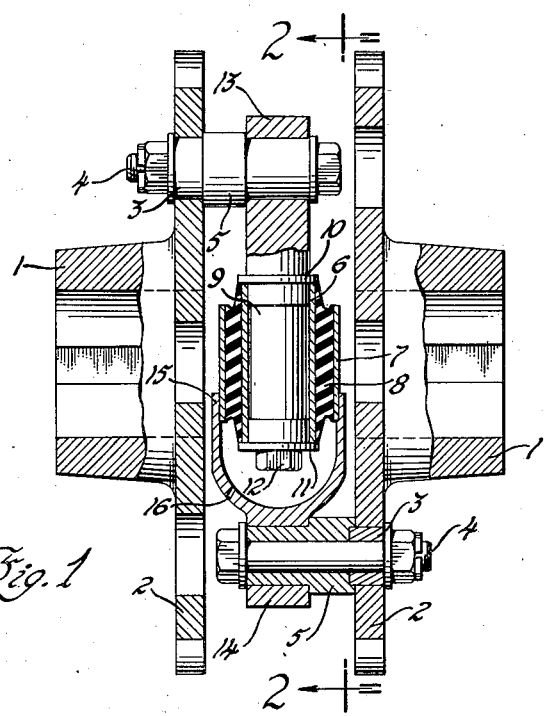
Figure 2:
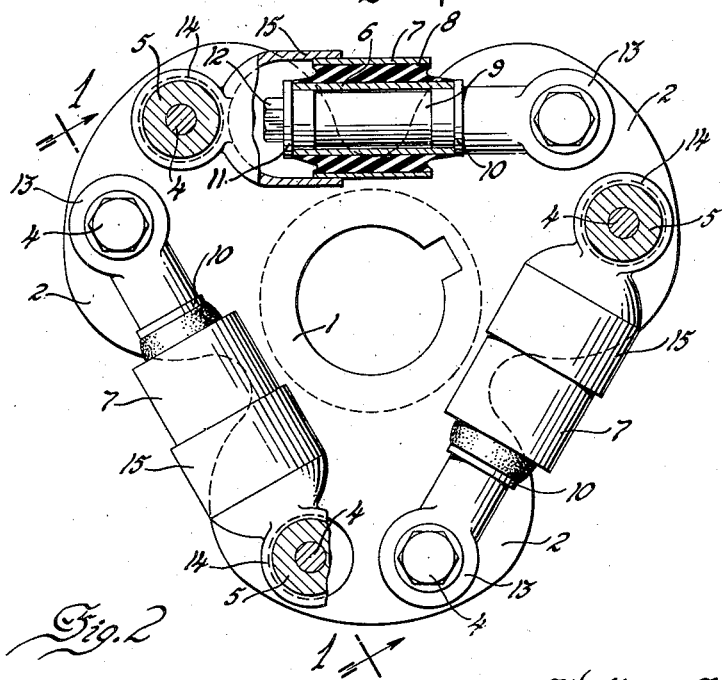

The structure is illustrated in the accompanying drawing wherein Figure 1 is a longitudinal sectional view of the coupling taken substantially on line 1—1 of Figure 2 and Figure 2 is a transverse section taken on line 2—2 of Figure 1 with a portion of one of the coupling units in section.

In the drawing the reference character 1—1 indicates a pair of hubs to be splined, keyed or otherwise secured to driving and driven shafts, respectively. To connect the hubs at substantial radial distance from the axial center each hub may carry an enlarged disk or a series of spokes to which the connecting struts are joined. For strength and light weight the hub extensions may be of clover-leaf shape, as best seen in Figure 2, so that there are three lobes 2—2 for a three strut assembly. Each lobe is connected to one end of an adjacent strut but is provided with two circumferentially spaced openings, in one of which is fitted a bearing bushing 3 for an attachment bolt or trunnion mounting pin 4 and the other of which opening is axially aligned with the head of a bolt secured on the corresponding lobe of the companion hub. This arrangement enables a suitable wrench to be inserted through the lobe into engagement with the stud head for assembly and disassembly convenience. In the space between the two hubs each stud 4 carries a shouldered bearing sleeve 5 on which is hingedly secured one end of an adjacent strut.

Each strut has an intermediate yieldable portion comprising a pair of concentric nested inner and outer spaced sleeves 6 and 7 having between them a bushing 8 of rubber or the like, which is surface bonded to the metal sleeves by frictional grip, vulcanization, cement or the like. Preferably the rubber bushing is initially loaded radially of its axis according to usual manufacturing practice. A central pin 9 extends through the inner sleeve 6 and has a fixed shoulder 10 engaging one end of the sleeve and a removable shoulder 11 engaging the other end of the sleeve and secured to the pin by a bolt 12 threaded into the end of the pin 9. From the end of the sleeve 6 opposite the detachable washer 11 the pin 9 projects from the cushion unit and terminates in an eye 13 for hinged attachment on an adjacent sleeve 5 secured to one of the hubs 1 by the bolt 4 beforementioned. To the companion hub 1 a corresponding trunnion bolt assembly hingedly mounts an enlarged eye 14 on the opposite end of the strut and integral with a hollow cap or cover shell 15 which is sleeved on the outer bushing 7 and welded, threaded, press fitted or otherwise fixedly secured thereto. The hollow space within the cap forms an air pocket which receives the inner end of the central plunger assembly, the interior space preferably having a bleeder port 16 in the wall of the cap 15 of a predetermined metered size.

In the coupling shown in the drawing three struts are employed connecting the hubs 1—1, but it will be understood that a greater or lesser number may be used. As best seen in Figure 2 the struts are arranged in circumferential succession with their axes tangentially related to the main axis of rotation so that the rotational force from one hub to the other is transmitted axially of the strut for either direction or rotation and the movement is transmitted from the inner plunger to the outer cylinder through the rubber bushing which yields elastically and thereby smooths out vibration with the elasticity of the rubber being augmented by the air pocket formed at one end. The yieldability of the strut and the hinged end connections make the coupling especially adapted for the compensation of shaft misalignment.

I claim:

1. In combination with a pair of rotary members to be coupled in drive relation, of a series of motion transmitting connectors between said members, each comprising a plunger carried by one of the members, a cylinder having an open end to receive the plunger therein and a chambered head closing the other end and being carried by the other member, and a bushing of rubber or the like interposed between and secured to the cylinder and the plunger and cooperating with the chambered head to provide an air pocket dashpot.

2. The structure of claim 1 wherein said air pocket is provided with an air bleeder port.

WM. H. OPITZ.